Aug. 12, 1958   F. W. GOODWIN   2,846,941
BARBECUE BASKET
Filed Feb. 13, 1956

INVENTOR.
Fred W. Goodwin
BY

United States Patent Office 2,846,941
Patented Aug. 12, 1958

2,846,941

BARBECUE BASKET

Fred William Goodwin, Orinda, Calif.

Application February 13, 1956, Serial No. 564,933

4 Claims. (Cl. 99—340)

The present invention relates to barbecue stoves. More particularly the present invention relates to the grilled baskets that are employed to hold the food to be broiled over the fire bed of barbecue stoves.

It is an object of my invention to provide a barbecue basket that may be attached to the spits or skewers, employed on barbecue stoves, for rotation therewith.

Another object of my invention is to provide a barbecue basket that may securely be attached to the rotary spits or skewers of barbecue stoves for rotation therewith, irrespective of the diameter or cross-sectional contour of the spit.

Still another object of my invention is to provide a barbecue basket, of the type referred to, that will dependably hold the food to be broiled as the basket turns with the spit upon which it is mounted.

Yet another object of my invention is to provide a barbecue basket, of the type referred to, with food retaining means that may be readily disengaged to release the food when the cooking operation has been completed.

Furthermore, it is an object of the present invention to provide a barbecue basket, of the type referred to, that is of simple and inexpensive construction.

These and other objects of my invention will be apparent from the following description of the accompanying drawing which illustrates a preferred embodiment thereof and wherein.

Figure 1:
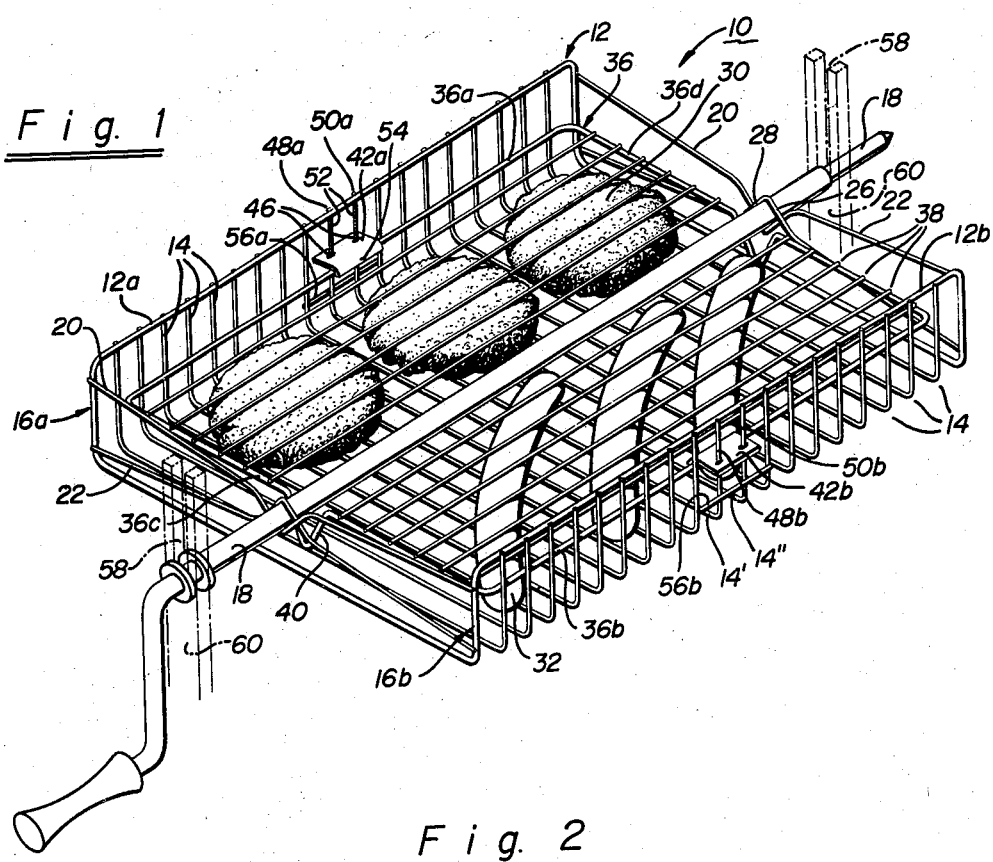
Figure 1 is a perspective of a barbecue basket constructed in accordance with my invention, mounted in position on a barbecue spit.

The barbecue basket illustrated in the accompanying drawing comprises a base or body portion 10 which constitutes the basket proper. Said body portion may be formed by a rectangular frame 12 of heavy chrome-plated wire, across the opposite side bars 12a and 12b of which are secured a plurality of equi-spaced parallel bars 14 of sturdy chrome-plated wire. The areas of said structure adjacent the side bars 12a and 12b are bent upwardly at right angles to the plane determined by the original frame to form the side walls 16a and 16b of the basket 10.

To secure the basket to a spit for rotation therewith, a pair of resilient bars in the form of steel wires 20 and 22 are secured across each of the ends of the basket in such a manner as to form resiliently expansible retaining loops 24 which are adapted to receive, and clamp down upon, spits 18 of widely varying diametrical sizes. Having particular reference to Figure 2, the opposite end portions of bar 20 are bent to decline toward the center thereof and the center portion of said bar is bent to form a V-shaped depression or indentation 26. The other bar 22 is of symmetrically identical conformation and forms at its center an indentation 28 in the shape of an inverted V, whose apex portion is arranged to overlap to a slight extent the apex portion of the V-shaped depression or indentation 26 of the upper wire 20 so that a two-partite loop is formed whose eye is adapted to receive the tip of a spit or skewer and which will expand, due to the resiliency of the bars 20 and 22, to accommodate spits of different diametrical sizes and cross-sectional contours that may be pushed through its eye.

Figure 3:
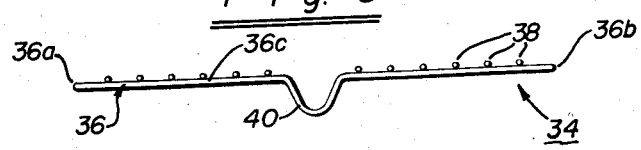
Figure 3 is an end elevation of the lid of the basket.

To retain the food to be barbecued, such as the meat patties 30 and sausages 32 indicated in Figure 1, in the basket 10, as said basket revolves on spit 18 over a fire bed, a grilled lid 34 is provided which is of such construction and disposition that it is securely held in the basket by the very spit or skewer 18 to which the basket is secured for rotation. Having reference to Figures 1 and 3, the lid is formed by a rectangular frame 36 of sturdy chrome-plated wire which is of such size as to fit readily into the basket 10; and secured across the end bars 36c and 36d of said frame are a plurality of equi-spaced parallel bars 38 in the form of sturdy chrome-plated wires, that extend at right angles to the cross bars 14 of basket 10. The center portions of the end bars 36c and 36d of lid frame 36 are depressed, as shown at 40, to form V-shaped indentations that provide space for the spit 18 when said spit is pushed through the loops 24 of the basket 10 with the lid 34 disposed within the basket, as shown in Figure 1.

Figure 2:
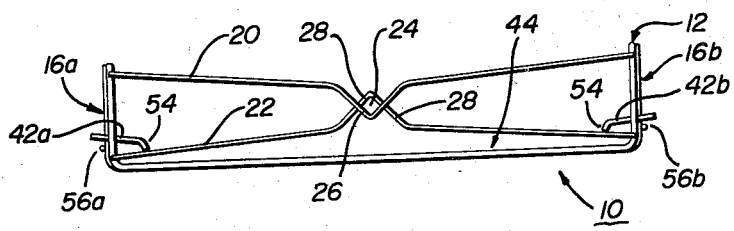
Figure 2 is an end elevation of the barbecue basket illustrated in Figure 1.

To hold the lid 34 firmly against the food in the basket so as to prevent slippage of the food during rotation of the basket, clamps 42a and 42b may be arranged on the basket side walls 16a and 16b to engage the side bars 36a and 36b of the lid frame 36 at any desired level above the floor 44 of the basket depending upon the thickness of the food products in the basket. These clamps may have the form of small rectangular plates that are provided with two juxtaposed apertures 46 that are engaged over the upturned end portions 48a, 50a and 48b, 50b of two centrally located adjacently positioned cross bars 14 of the basket 10 which are individually identified by the primes (') and (") in Figure 1, and which are provided with a plurality of vertically spaced horizontal notches 52. Along their inner edges the clamps 42a, 42b may be bent downwardly to form lips 54 which prevent accidental disengagement of the clamps from the side bars of the lid frame 36. Brace bars 56a and 56b may be rigidly connected to the upturned end portions 48a, 50a and 48b, 50b of the cross bars 14' and 14" and the upturned end portions of adjacent cross bars 14, as shown in Figures 1 and 2, to give the necessary rigidity to the notched end portions of the cross bars 14' and 14" for their task in mounting the clamps 42a and 42b.

In practical use, the food to be barbecued, such as the meat patties 30 and sausages 32 (Figure 1), are placed onto the floor 44 of the basket 10 and the lid 34 is placed over the food with the V-shaped indentations 40 of its end bars 36c and 36d extending downwardly. The opposite sides of the lid may now be pressed down tightly upon the food whereupon the clips 42a and 42b are engaged over its side bars 36a and 36b. Then, as the sides of the lid endeavor to rise to their original level under the resiliency of the steel wire from which the lid is made and under the resiliency of the food materials upon which the lid was pressed down, the clips 42a and 42b are tilted which binds the edges of their apertures 46 against the ridges formed between the notches 52 in the upturned end portions of the cross bars 14' and 14" of the basket. As a result thereof, the clips can no longer yield upwardly, and the lid is firmly held in position against the food in the basket so that the food cannot slip when the basket is turned during the broiling process.

The tip of the spit or skewer 18 is now inserted into the loop 24 formed by the two V-shaped indentations of the end bars 20 and 22 at one end of the basket, is pushed through the indentations 40 in the end bars of the lid frame 36 and through the loop 24 at the opposite end of the basket 10. Depending upon the thickness of the spit, the V-shaped indentations of the bars 20 and 22 that form the loops 24 at either end of the basket will slide over each other to a larger or lesser degree against the resiliency of said bars 20 and 22 to permit entrance of the spit between their apex portions, and will firmly grip the spit so that the basket 10 will turn with the spit when the spit is rotated above a fire bed, particularly if the spit is of square or polygonal cross sectional contour, as illustrated. Once the spit has been thrust through the loops 24 at either end of the basket 10, it acts as a safeguard to hold the lid 34 upon the food in the basket so that there is no danger that the food may spill into the fire during the cooking operation if one of the clips should accidentally fail. The spit with the basket 10 mounted thereon may now be placed into position over the fire bed of a barbecue stove in the usual manner by dropping its opposite ends into slots 58 provided in suitable supports 60 indicated in phantom lines in Figure 1 that rise from the edge of the barbecue stove (not shown). When thus positioned, the spit may be turned either by hand or by a suitable motor.

When the food in the basket has been cooked to the desired degree, the spit is lifted from the supports 60 and the basket mounted thereon is placed upon a suitable table or serving platform (not shown), whereupon the spit is withdrawn from the loops 24. This frees the lid 34 except for the clips 42a and 42b which may be released by forcing them into a horizontal position so that the apertures 46 will clear the ridges in the upturned portions of the cross bars 14' and 14", whereupon the clips may be lifted to free the lid.

While I have explained my invention with the aid of a particular embodiment thereof, it will be understood that the invention is not limited to the specific constructional details shown and described, which may be departed from without departing from the spirit and scope of my invention.

I claim:

1. A barbecue basket having a grilled body and pairs of superposed resilient bars secured across opposite end of said body and having oppositely directed indentation located in adjacent parallel planes arranged to overlap partially to form resiliently expansible loops at opposite points of said body.

2. A barbecue basket comprising a grilled body having a floor and a pair of side walls, and pairs of superposed resilient bars secured across the opposite ends of said body and having oppositely directed V-shaped indentations whose apex portions overlap each other to form resiliently expansible loops.

3. A barbecue basket comprising a grilled body, resilient bars secured across opposite ends of said body and having oppositely directed partially overlapping indentations which form resiliently expansible loops, a grilled lid within said body for holding the food to be barbecued therein during rotation of the basket, said lid having a depressed center portion, a removable skewer extending through said loops and above the depressed center portion of said lid, and means for retaining the said lid in position within said body during rotation of the basket with said skewer.

4. A barbecue basket comprising a grilled body, resilient bars secured across opposite ends of said body and having V-shaped indentations whose apex portion overlap each other to form resiliently expansible loops, a grilled lid within said body for holding the food to be barbecued therein during rotation of the basket, and means including a skewer extending through said loops, for retaining the said lid in position within said body during rotation of the basket.

References Cited in the file of this patent

UNITED STATES PATENTS

| | | |
|---|---|---|
| 419,159 | Randall | Jan. 7, 1890 |
| 547,593 | Wagoner | Oct. 8, 1895 |
| 2,455,034 | Zoegall | Nov. 30, 1948 |
| 2,503,811 | Emigholz | Apr. 11, 1950 |
| 2,682,830 | Kupchik | July 6, 1954 |
| 2,705,450 | Steinbook | Apr. 5, 1955 |
| 2,760,428 | Boyajian | Aug. 28, 1956 |